(12) United States Patent
Stabb et al.

(10) Patent No.: US 7,581,192 B2
(45) Date of Patent: Aug. 25, 2009

(54) METHOD AND APPARATUS FOR APPLICATION WINDOW GROUPING AND MANAGEMENT

(75) Inventors: Charles W. Stabb, Seattle, WA (US); Donald J. Lindsay, Mountain View, CA (US); Mark R. Ligameri, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/094,140

(22) Filed: Mar. 31, 2005

(65) Prior Publication Data

US 2006/0224991 A1 Oct. 5, 2006

(51) Int. Cl.
G06F 3/048 (2006.01)

(52) U.S. Cl. .................. 715/781; 715/759; 715/795

(58) Field of Classification Search ............ 715/781, 715/759, 795, 797, 802
See application file for complete search history.

(56) References Cited

U.S. PATENT DOCUMENTS

| | | | |
|---|---|---|---|
| 5,412,776 A | 5/1995 | Bloomfield | |
| 5,499,334 A | 3/1996 | Staab | |
| 5,668,962 A | 9/1997 | Kitami | |
| 5,694,561 A * | 12/1997 | Malamud et al. | 715/805 |
| 5,889,517 A | 3/1999 | Ueda et al. | |
| 6,160,554 A | 12/2000 | Krause | |
| 6,429,855 B2 | 8/2002 | Pabon | |
| 6,781,611 B1 | 8/2004 | Richard | |
| 6,957,395 B1 * | 10/2005 | Jobs et al. | 715/765 |
| 2001/0028368 A1 | 10/2001 | Swartz | |
| 2004/0066408 A1 | 4/2004 | Meyers et al. | |
| 2004/0066414 A1 * | 4/2004 | Czerwinski et al. | 345/781 |
| 2005/0091610 A1 * | 4/2005 | Frei et al. | 715/804 |
| 2005/0210410 A1 * | 9/2005 | Ohwa et al. | 715/821 |
| 2005/0223334 A1 * | 10/2005 | Guido et al. | 715/794 |

* cited by examiner

*Primary Examiner*—Ba Huynh
*Assistant Examiner*—Shashi K Becker
(74) *Attorney, Agent, or Firm*—Shook, Hardy & Bacon L.L.P.

(57) ABSTRACT

A method for displaying a plurality of windows on a display screen is described. The method includes steps of displaying a first application window and a second application window on a display screen, declaring the first application window and the second application window as a group, the second application window being independent of and external to the first application window, grouping the first application window and the second window into a group, and displaying the group as a representation on the display screen. As new application windows are opened, they may be added to the group and/or they may become members of a second group of application windows. A user may switch between various groups.

18 Claims, 15 Drawing Sheets

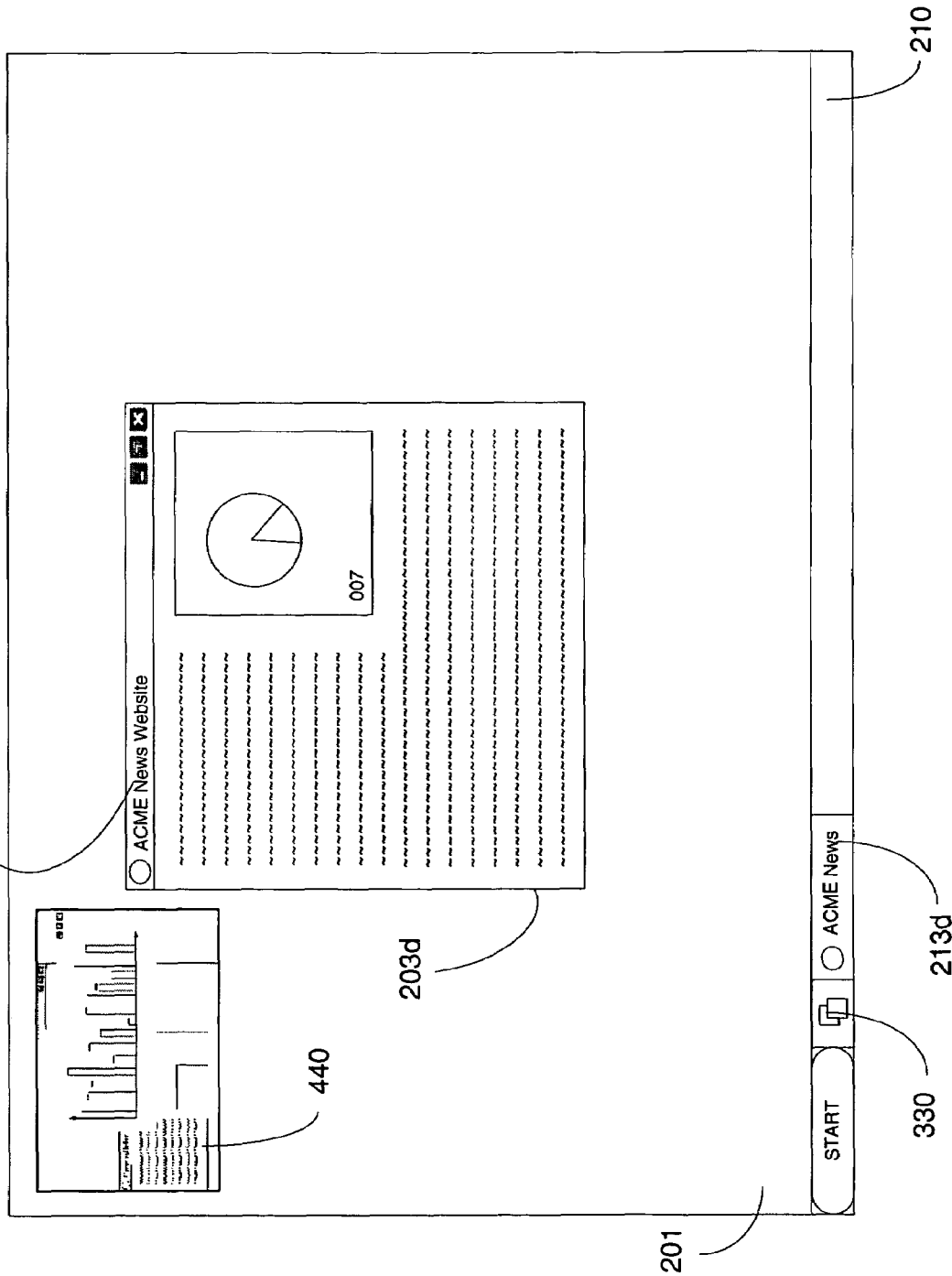

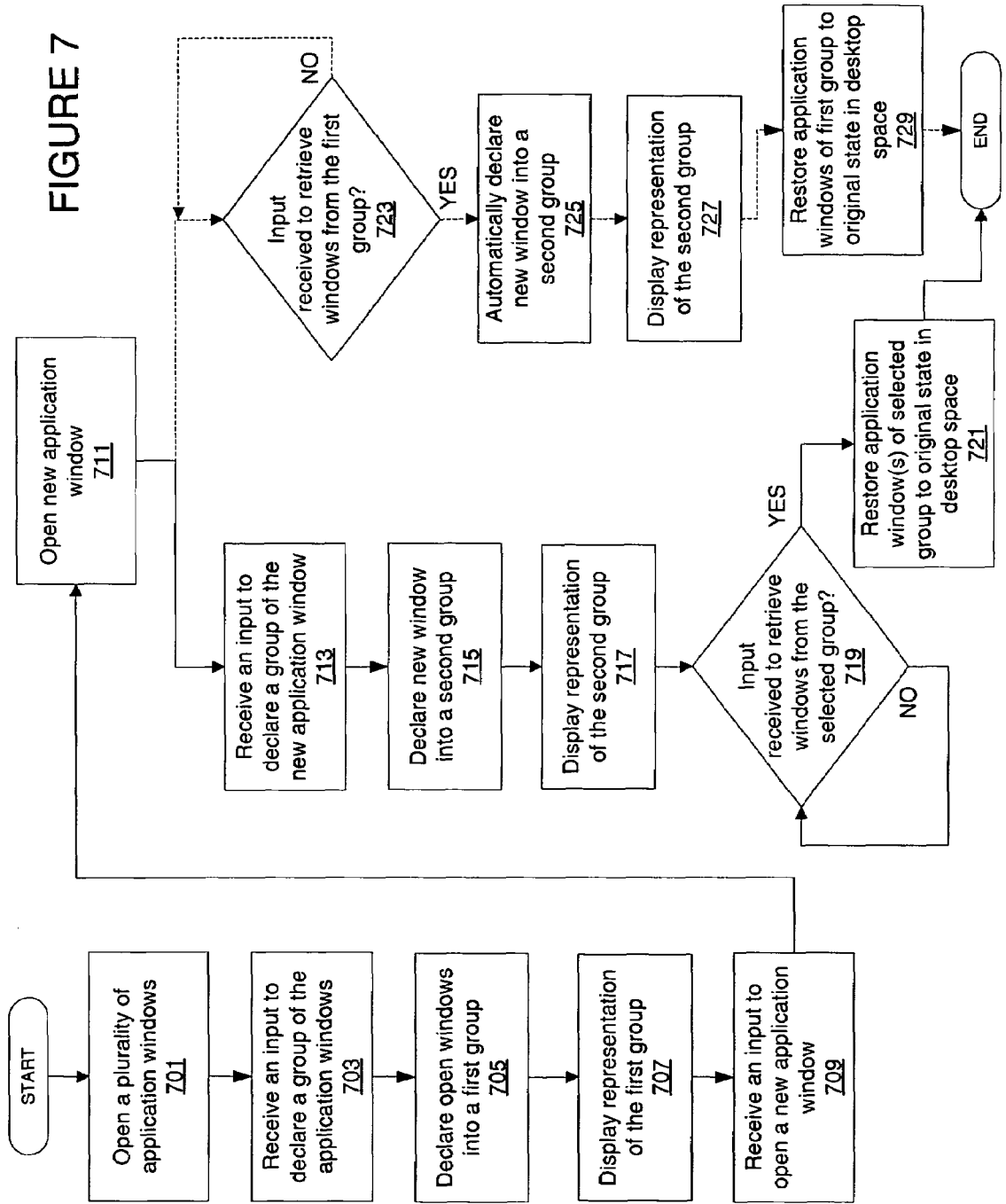

METHOD AND APPARATUS FOR APPLICATION WINDOW GROUPING AND MANAGEMENT

FIELD OF THE INVENTION

Aspects of the present invention are directed generally to window arrangements in an operating system. More particularly, aspects of the present invention are directed to a method and system for grouping multiple windows in an operating system and allowing some intelligent behavior to exist between the windows.

BACKGROUND OF THE INVENTION

As the use of computers in both the workforce and personal life has increased, so has the desire to allow for easier use of them. Many operating systems today utilize a windows based configuration of application programs. Information is displayed on a display screen in what appears to be several sheets of paper. By interfacing with the windows, a user can access any window as if grabbing a single sheet of paper. A windows based configuration allows a user to have two or more windows open on a display screen simultaneously.

Application windows are a user interface facility of all graphical user interface (GUI) systems. While application windows may vary in appearance across systems, they share many common attributes such as the ability to be resized and repositioned and to exist among other application windows associated with different applications. Together, multiple application windows can appear simultaneously on the screen, layered on top of each other, typically represented by the order each window was last accessed by the user.

A user interaction scenario common to modern GUIs involves multiple simultaneous open application windows that share a common screen real estate. Support for multiple simultaneous open application windows is part of the appeal and power of a modern GUI, but this frequently results in application windows overlapping and obscuring each other making it difficult for the user to locate or navigate to a specific application window. This type of scenario and associated solutions are commonly referred to as window management problems and solutions.

Users typically associate an application window with a task, such as email, and can further create mental associations between multiple application windows and a single task or project. For example, in order to produce a slide show presentation, a user may require content from three or four different application windows, possibly from one or more applications, such as email, a graphics application, and a spreadsheet application. Multiple application windows may be visible on a screen and each application window is associated with one or more tasks. A user must locate and navigate between these disparate application windows in order to access or exchange content to complete the task.

There is a common window management solution in many GUIs whereby an application window can be minimized and removed from view in the primary working screen space. A minimized application window is typically represented by a significantly smaller UI element. In Windows XP by Microsoft® Corporation of Redmond, Wash., minimized application windows are represented as buttons on a control bar, such as the Task Bar control. In Mac OS X by Apple Computer, Inc. of Cupertino, Calif., minimized application windows are represented as miniature thumbnail buttons in the Dock. Minimizing application windows allows the user to remove unneeded application windows from the screen space, allowing them to focus on a smaller set of application windows. However, minimizing application windows can only be performed individually. Similarly, application windows can be retrieved from the minimized state and re-introduced to the set of visible application windows, but this can only be done on an individual application window basis.

Presently, independent and external windows cannot be grouped together, so heterogeneous windows cannot be managed together. Operating systems do not currently allow for multiple windows to be grouped with each other so that an operation performed on one window cannot be performed automatically on a second independent and external application window.

SUMMARY OF THE INVENTION

There exists a need for the ability to group any two or more application windows together, so heterogeneous windows can be managed together. There is a need for a method for displaying a first application window and a second application window on a display screen, declaring the first application window and the second application window as a group, the second application window being independent of and external to the first application window, grouping the first application window and the second application window into a group, and displaying the group as a representation on the display screen.

Aspects of this invention provide a window management system to aid in managing multiple application windows as a group. Aspects of the invention provide a new method and apparatus to create a group of application windows, minimize that group, and allow previously-identified groups to be retrieved. This method allows users to formalize their application window-to-task associations, e.g., create a group, and provide a facility to manage those associations, e.g., application window group icons.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 4 illustrates another example of a window management system upon execution of a grouping control in accordance with at least one aspect of the present invention;

FIG. 7 is a flowchart of an illustrative example of a method for switching between multiple groupings of windows in accordance with at least one aspect of the present invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1A:
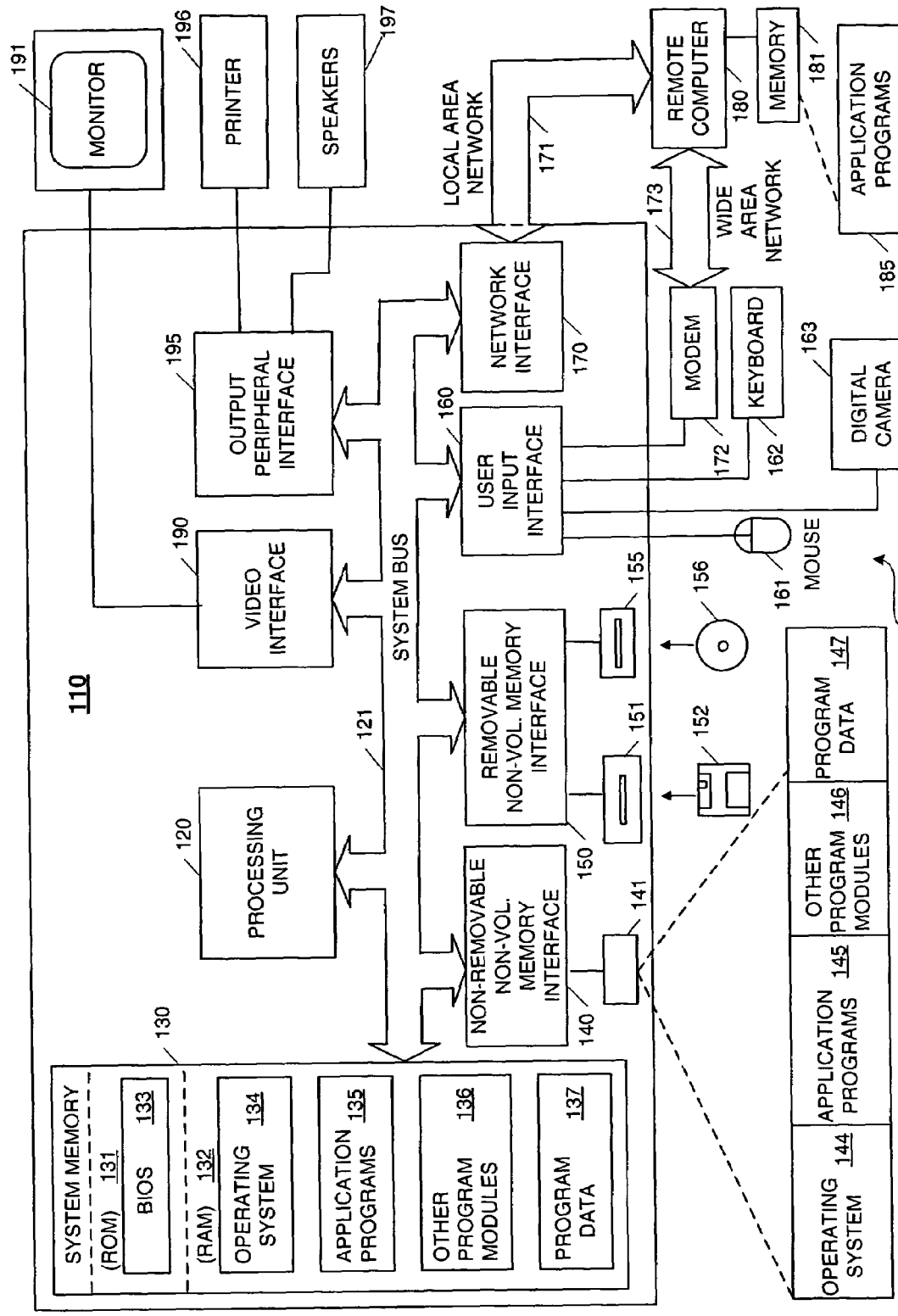
FIG. 1A illustrates a schematic diagram of a general-purpose digital computing environment in which certain aspects of the present invention may be implemented.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
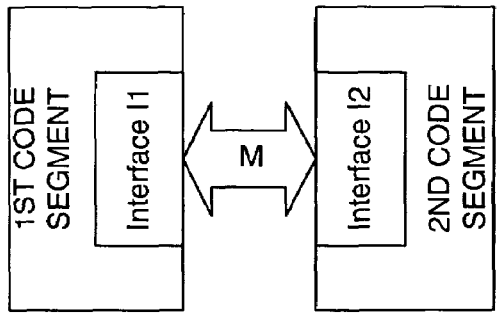
FIGS. 1B through 1M show a general-purpose computer environment supporting one or more aspects of the present invention.
Figure 1E:
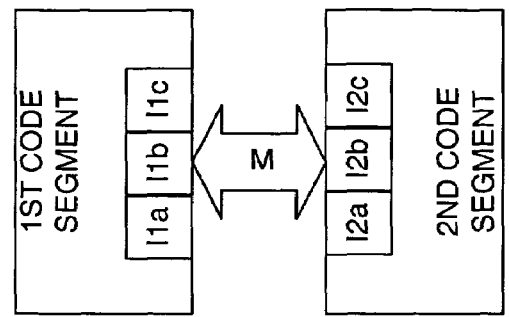
Figure 1B:
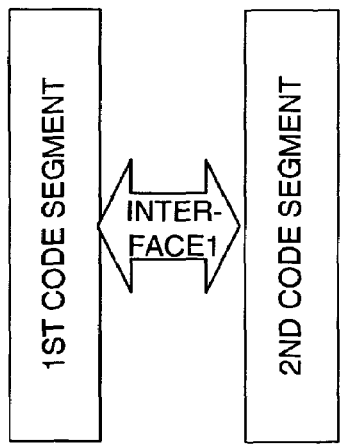

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bidirectional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
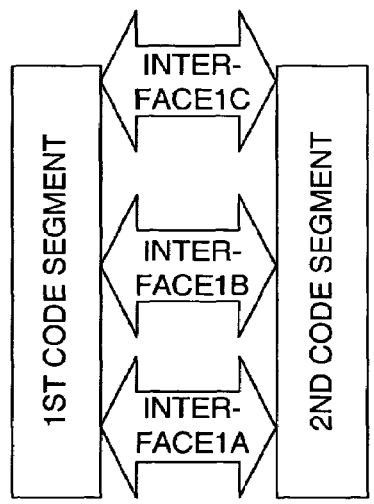

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
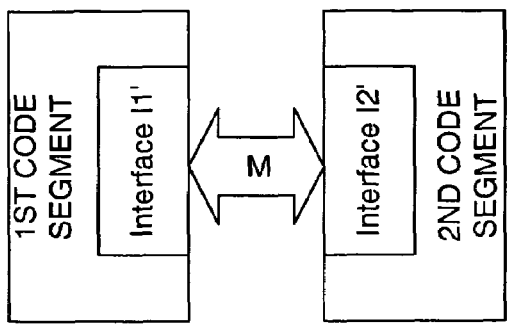
Figure 1G:
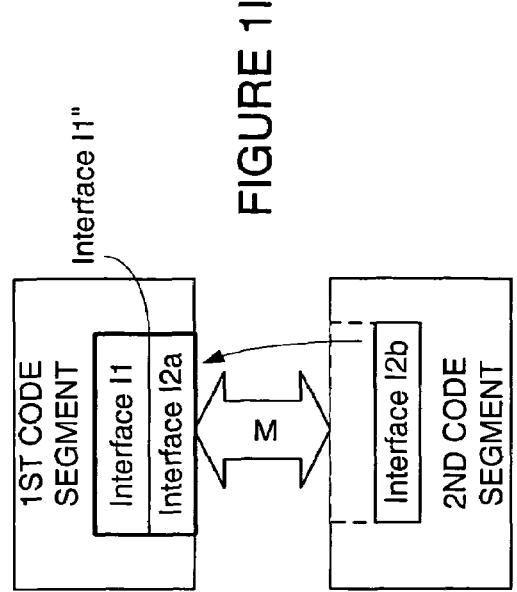

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
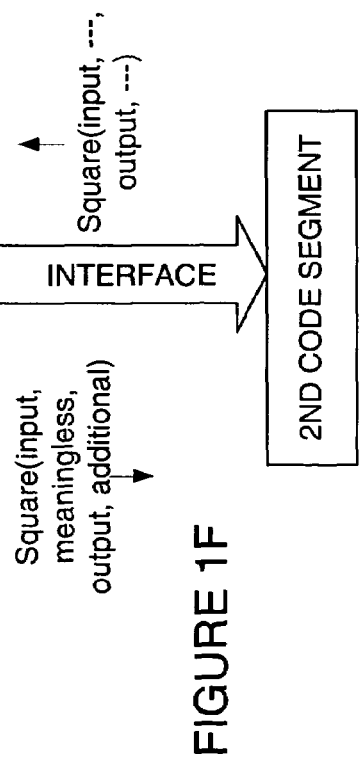
Figure 1I:
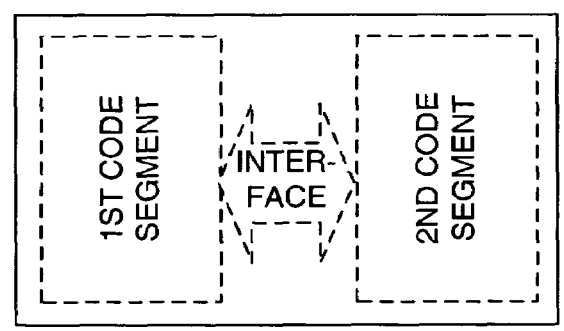

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
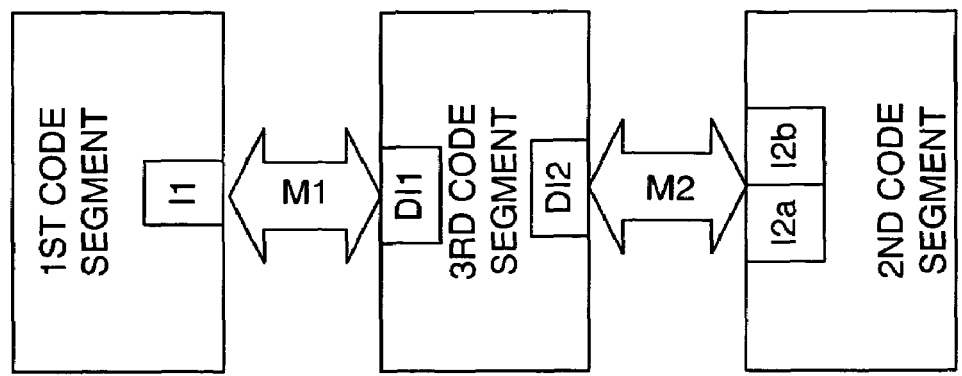
Figure 1J:
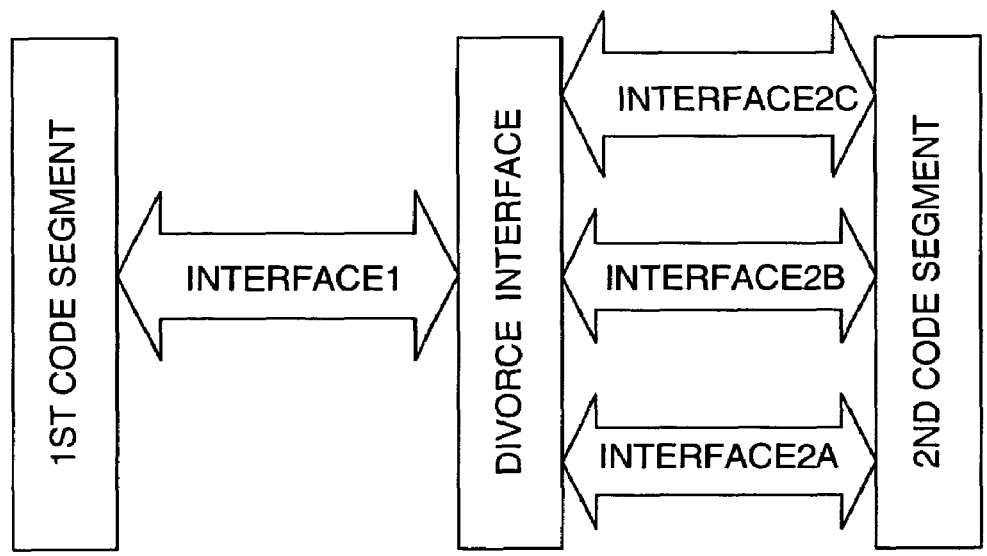

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
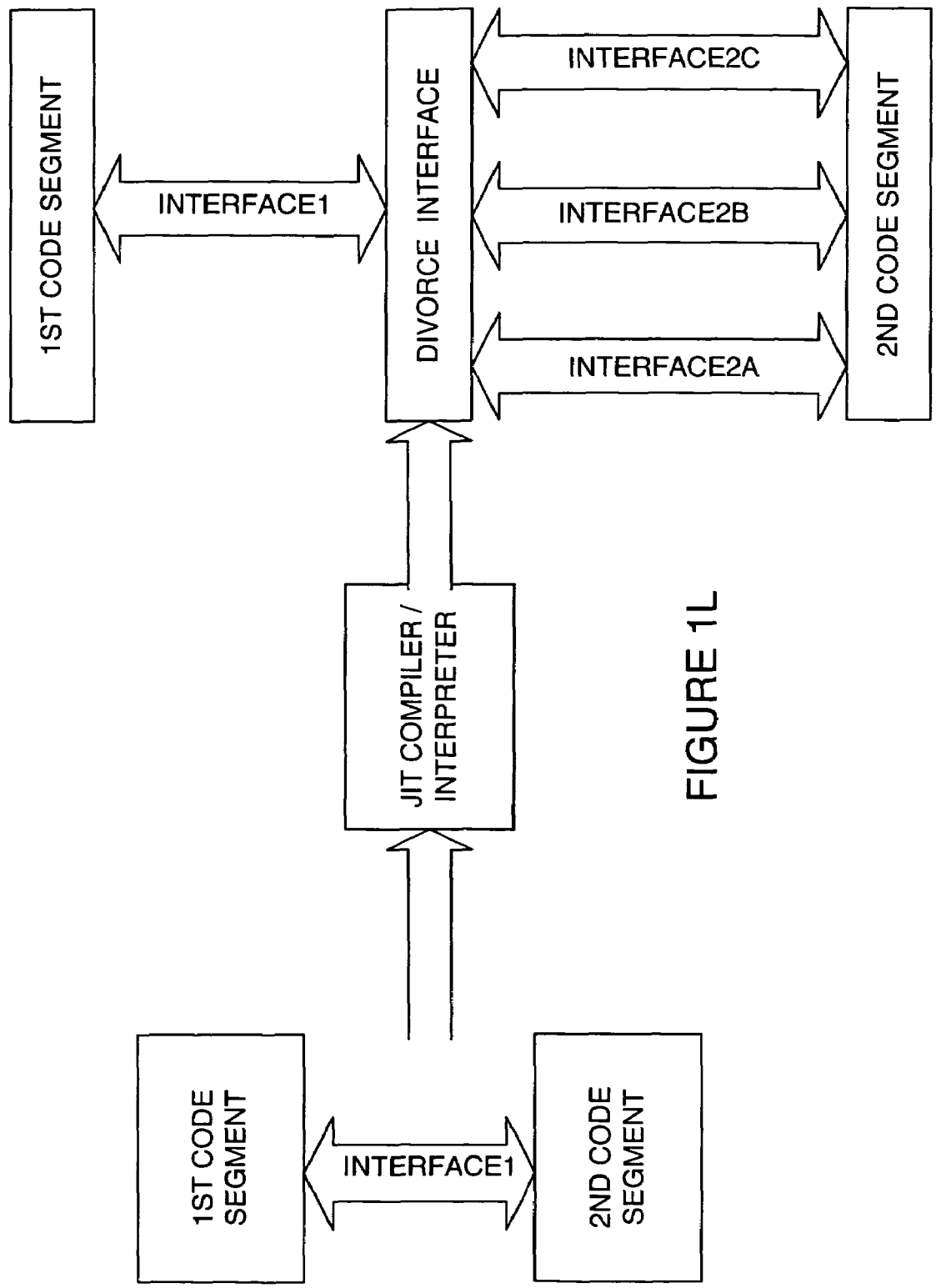
Figure 1M:
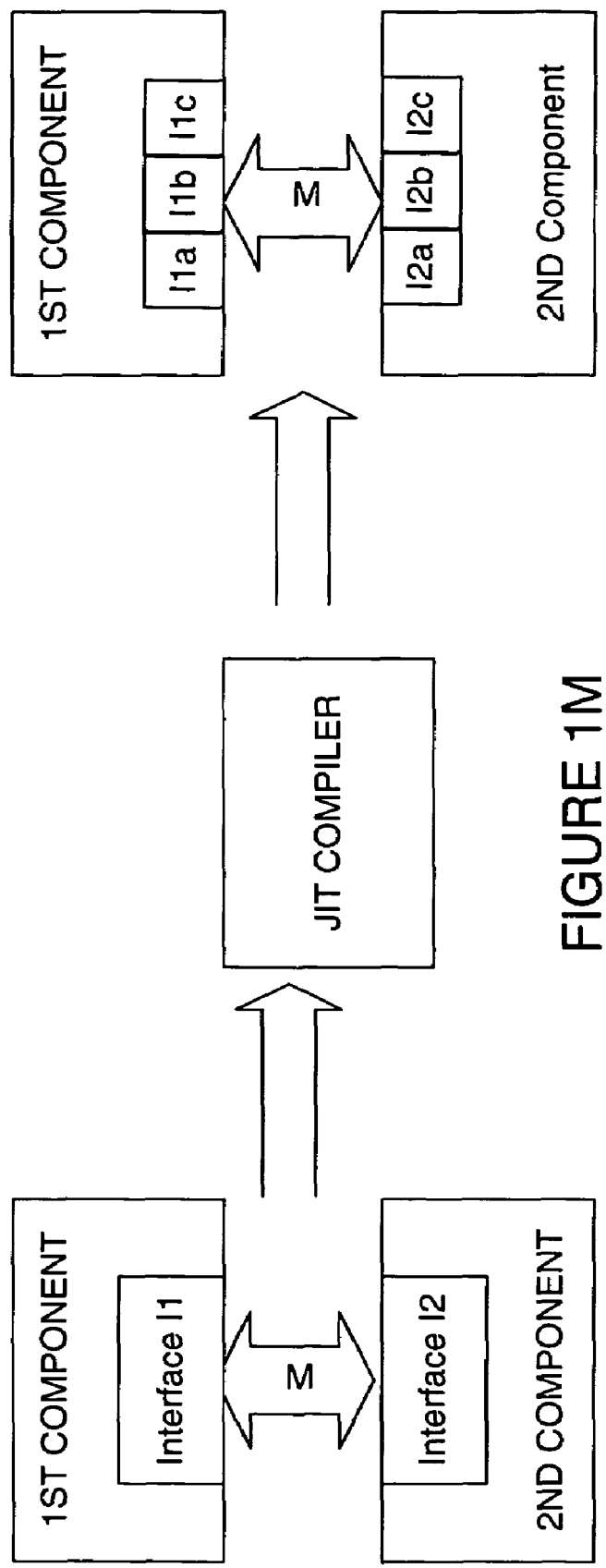

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2:
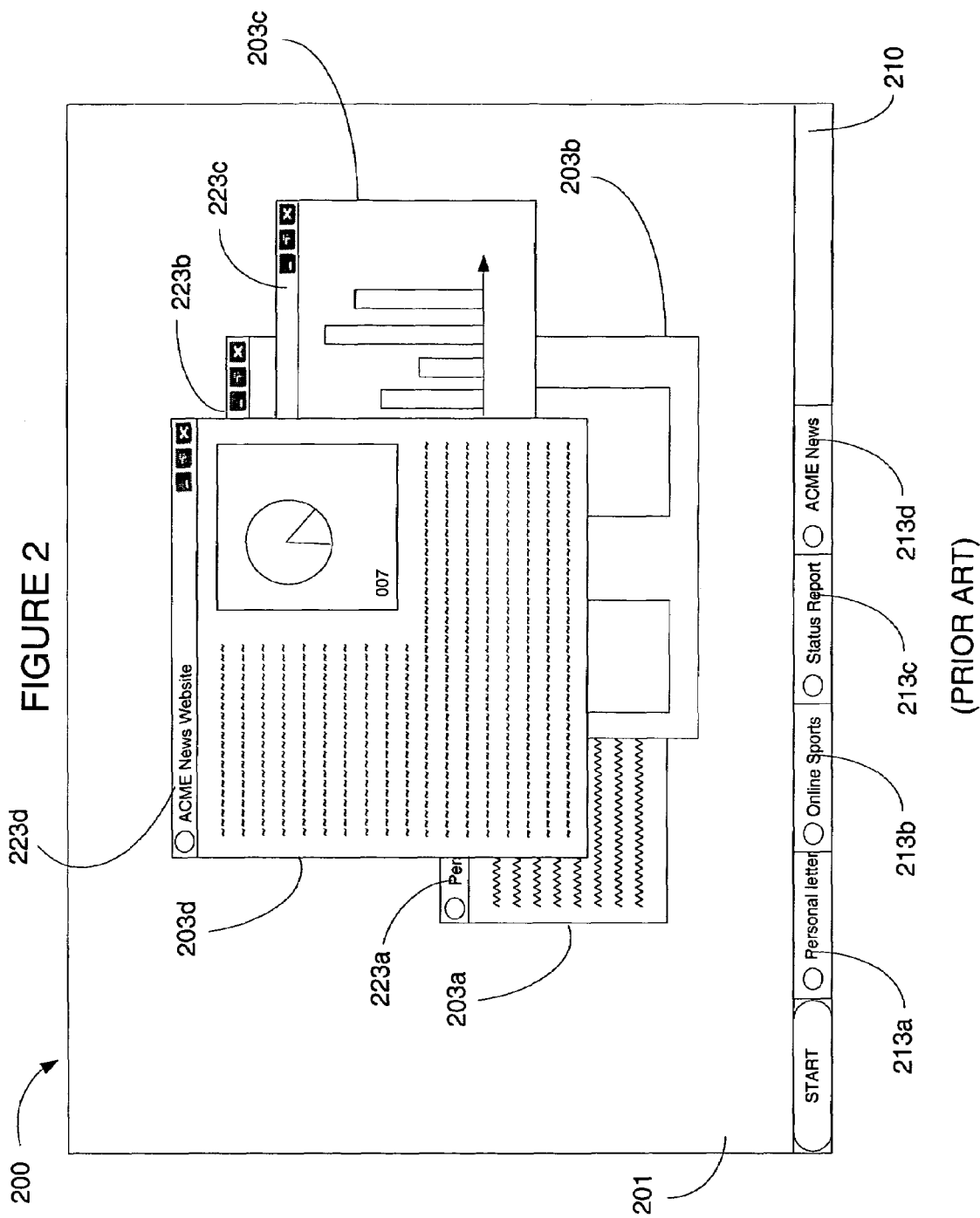
FIG. 2 illustrates a conventional window management scenario.

FIG. 2 illustrates a conventional window management scenario 200 common to graphical user interface systems. As shown, multiple open application windows are partially or completely obscured by other, larger windows that are positioned in front. Specifically, FIG. 2 shows a scenario 200 of four windows 203a-203d in a Z-order configuration in which application window 203d is higher in the Z-order than windows 203a, 203b, and 203c. Application windows 203a-203d are shown within a desktop space 201.

Desktop space 201 is an area of a display that allows for the display of windows corresponding to application programs. The taskbar 210 at the bottom indicates which application windows are currently in use, which may be visible or minimized. A taskbar 210 is a specific implementation of an on-screen window remote control used to list and enable manipulation of windows, such as activating, moving, hiding, and minimizing. Window 203a is represented by taskbar button 213a, window 203b by taskbar button 213b, window 203c by taskbar button 213c, and window 203d by taskbar button 213d. As shown in this example, the four windows 203a-203d are shown open. The file name of the content of windows 203a-203d is shown along the title bar area 223a-223d of the respective window. These file name may be generated by the application program operating the window and/or may be customizable by a user. The same file name for each window 203a-203d is shown in the corresponding taskbar buttons 213a-213d.

Windows 203a-203d are used by application programs to display content to a user. The application program associated with window 203a may be a different application program or the same application program corresponding to window 203b, 203c, and/or 203d. Each of windows 203a-203d is independent of and external to the other windows 203a-203d. As used herein, a first window is external to a second window when the first window is not contained within the second window and the second window is not contained within the first window. It should be understood that a first window is not contained in a second window if the two windows merely overlap.

As shown in FIG. 2, a user has explicitly opened this set of application windows 203a-203d in order to complete a task. The task may involve obtaining information or content from each of the open application windows 203a-203d. For example, this task may require an Internet browser window and two windows from a graphics editing application. If the user opens additional application windows unrelated to this first task, these existing application windows 203a-203d would remain unchanged in desktop space 201. Using existing window management solutions, a user could minimize each of the application windows 203a-203d associated with the first task individually to remove them from view. In order to return to the original task, the user would have to individually retrieve each minimized application window 203a-203d.

Figure 3A:
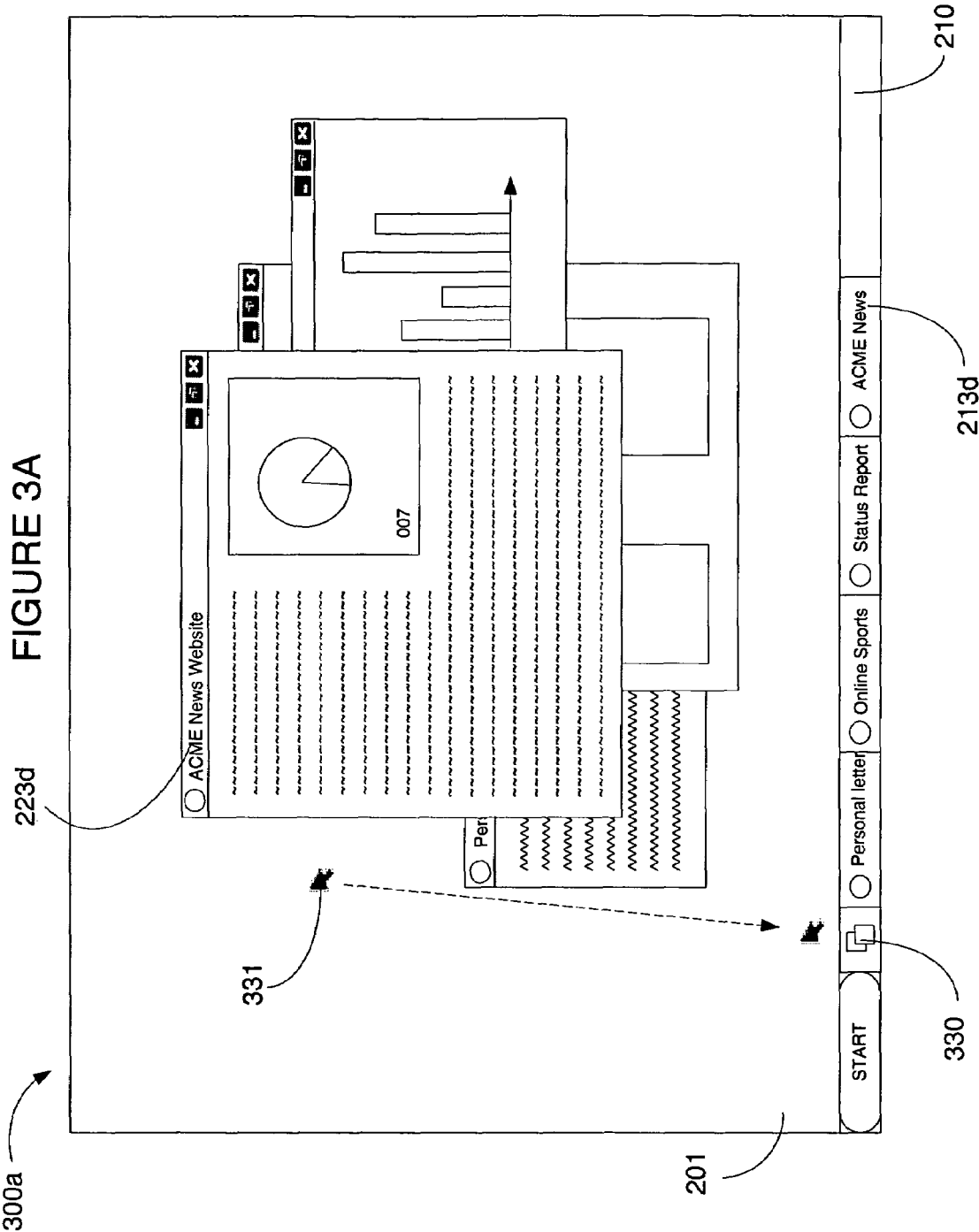
FIG. 3A illustrates an example of a window management system including a grouping control in accordance with at least one aspect of the present invention.

As shown in FIG. 3A, in accordance with aspects of the present invention, a user interface control 330 is provided to declare a set of currently open and/or active application windows 203a-203d as a window group. FIG. 3A illustrates an example of a window management system including a grouping control 330 in accordance with at least one aspect of the present invention. As used herein, the terms "declare" and "declaring" are defined herein to mean initiating an action to create a relationship between two independent and external application windows.

In scenario 300a, a user moves a pointer 331 towards an application window grouping control 330. Although shown in the taskbar area 210, it should be understood by those skilled in the art that the grouping control element 330 may be located in other locations, such as within the desktop space 201. Further, although shown in FIG. 3A as an actuatable button, grouping control 330 may be initiated to group application windows by other means. For example, in one embodiment, a user can perform a single and/or sequence of key/button strokes to group two or more windows, such as application windows 203a-203d. A user can press a predefined sequence of key strokes on a keyboard to group the application windows. In another embodiment of the present invention, a user can click and drag taskbar button 213a to taskbar button 213b to initiate the process for grouping window 203a and window 203b. In still another embodiment, a user can click an actuation button on an input device, such as an electronic mouse, to group application windows 213a and 213b directly or indirectly by actuating taskbar buttons 213a and 213*b*. It should be understood by those skilled in the art that the present invention is not so limited to the examples included herein.

Figure 3B:
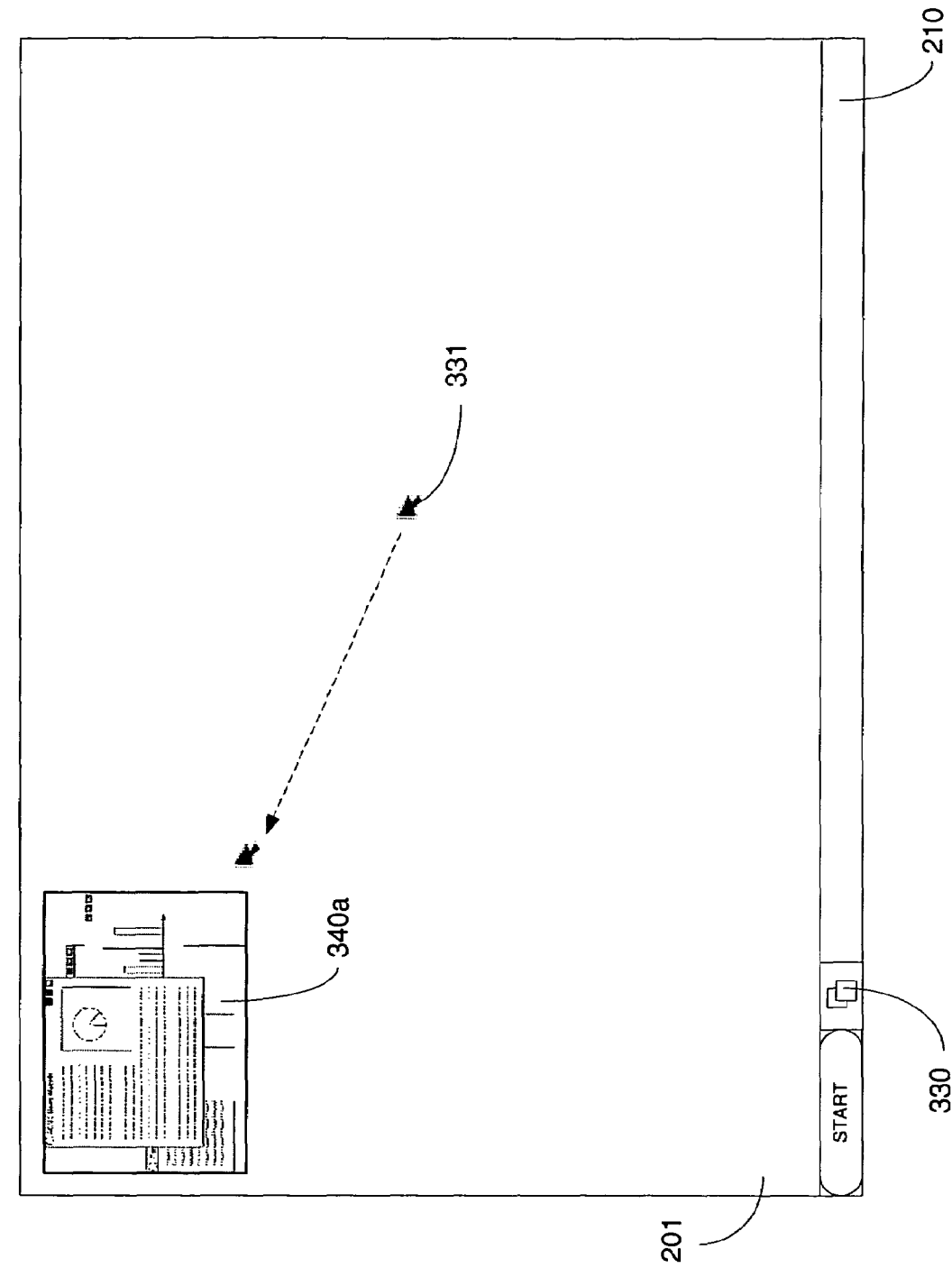
FIG. 3B illustrates an example of a window management system upon execution of a grouping control in accordance with at least one aspect of the present invention.

Returning to FIG. 3A, upon depressing the grouping control 330, windows 203*a*-203*d* may be grouped together where the group then may be scaled, collectively, down to a size of a thumbnail image 340*a* as shown in FIG. 3B. An illustrative example of depression of grouping control 330 is shown in scenario 300*b* in FIG. 3B. In this example scenario 300*b*, the grouping of windows 203*a*-203*d* has been scaled down to a thumbnail image 340*a* in the desktop space 201. In addition, taskbar buttons 213*a*-213*d* have been removed from the taskbar area 210. Although not shown in this example, it should be understood that one or more of the corresponding taskbar buttons 213*a*-213*d* may remain within the taskbar area 210.

Grouped windows are a set of windows that can be managed, e.g., saved, refreshed, etc., together as a representation of the group. Grouping windows together reduces the amount of window management a user must perform as well as reduces the visual clutter of a work surface consisting of overlapping windows. Additionally, a group of windows can be persisted together, so that the group of windows can be retrieved at a later time. Any application window can be added to or later removed from the thumbnail image 340*a* of application windows 203*a*-203*d*.

To restore the previously minimized application windows from the thumbnail image 340*a*, a user may move the pointer 331 and activate, e.g., click on, the thumbnail image 340*a*. Responsive to a user clicking on the desktop icon 340*a*, the grouping of windows 203*a*-203*d* are restored to their state prior to execution of the group control 330. In this example, the appearance of the windows would look just as it did in FIG. 3A.

Figure 3C:
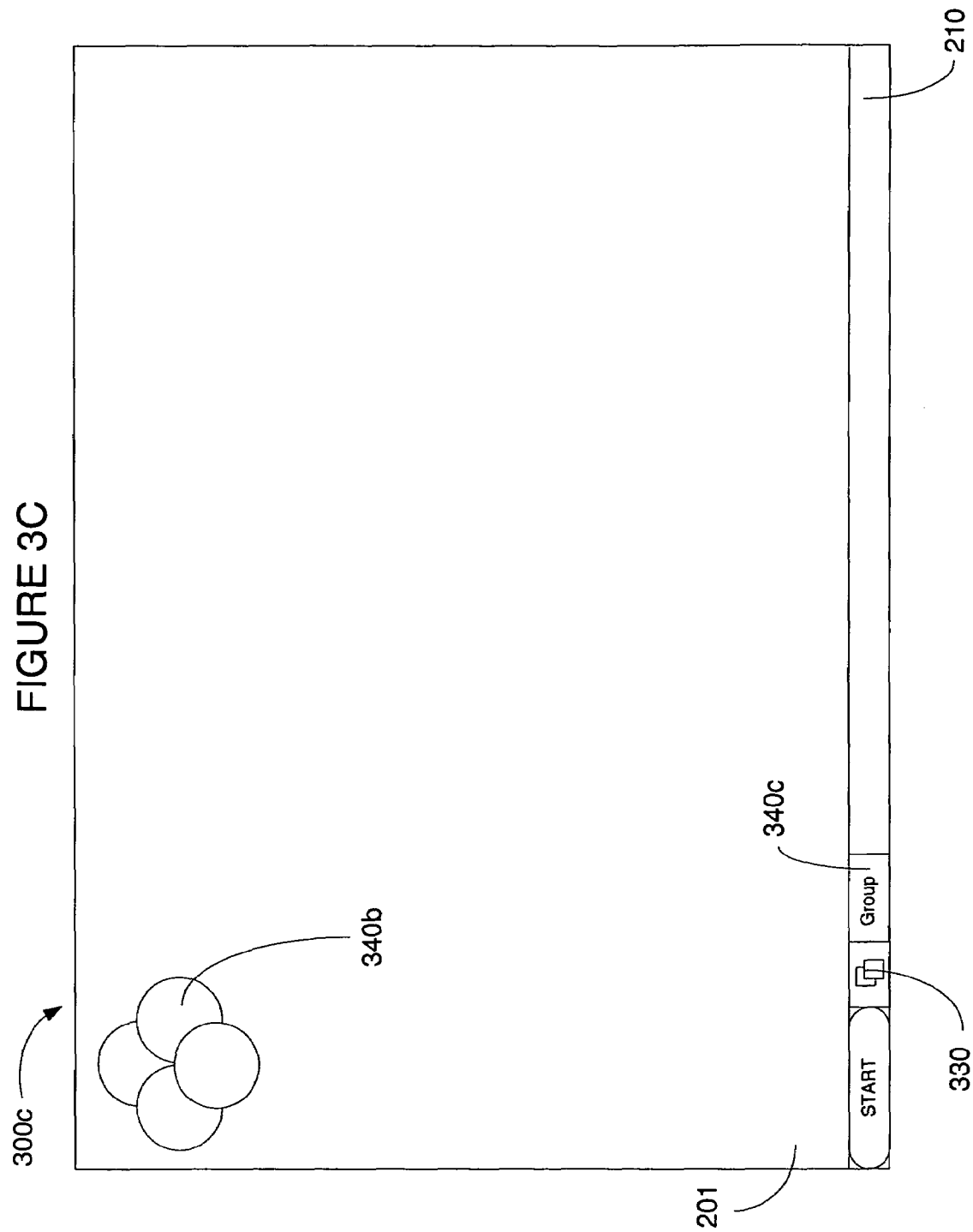
FIG. 3C illustrates other examples of a window management system upon execution of a grouping control in accordance with at least one aspect of the present invention.

FIG. 3C illustrates other examples of a window management system upon execution of a grouping control 330 in accordance with at least one aspect of the present invention. As shown in FIG. 3B, scenario 300*c* may show the grouping of windows 203*a*-203*d* as some type of icon 340*b* instead of a thumbnail image 340*a* of the application windows 203*a*-203*d*. Alternatively and/or in addition, a taskbar button 340*c* may be created to represent the grouping of windows 203*a*-203*d*. As with thumbnail image 340*a*, the windows 203*a*-203*d* may be restored by activation of the icon 340*b* and/or the taskbar button 340*c*. In such an example, the appearance of the windows again would look just as it did on FIG. 3A.

FIG. 4 illustrates another example of a window management system upon execution of a grouping control 330 in accordance with at least one aspect of the present invention. In this scenario 400, a portion, e.g., three of the four open application windows 203*a*-203*d* has been declared as a group and scaled to a thumbnail image 440. As such, in one embodiment of the present invention, a user may choose to group windows 203*a*-203*c*, while leaving window 203*d* open and active in the desktop space 210. Many different methods may be used in order to allow for groupings of fewer than all open windows in a desktop space 201 and the present invention is not so limited to any one method. It should be understood by those skilled in the art that open windows that are minimized to the taskbar are 210 may also be included in a window group by actuation of group control 330. In other embodiments, the system may be configured to only group open and active windows, even if overlapped by another open window, while not grouping any minimized window.

Figure 5A:
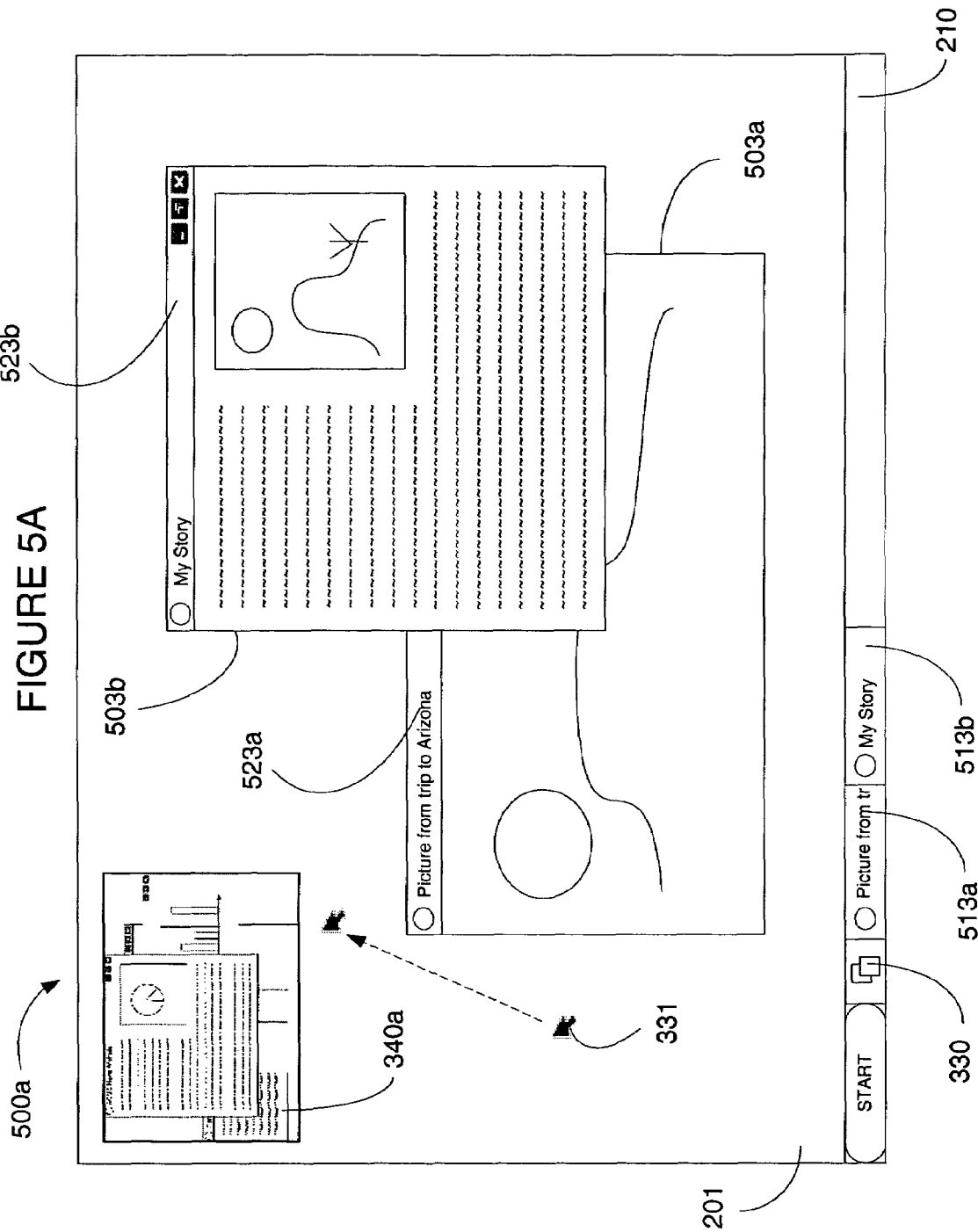
FIG. 5A illustrates another example of a window management system in which multiple groupings of windows are shown in accordance with at least one aspect of the present invention.

Once a window group has been declared and minimized to the thumbnail image 340*a*, the user can proceed with opening new application windows, or restoring previously-minimized application windows. Windows opened after the window group has been declared implicitly may be considered members of a second window group. FIG. 5A illustrates a scenario 500*a* where a window group 340*a* has been declared and minimized and additional application windows 503*a* and 503*b* have subsequently been opened. These application windows are members of a second window group. Similarly to windows 203*a*-203*d*, windows 503*a* and 503*b* have corresponding taskbar buttons 513*a* and 513*b* in the taskbar area 210.

Once a window group has been declared and minimized, a user can retrieve that group by opening the group through standard, pre-existing opening mechanisms, such as double-clicking on the thumbnail image 340*a* or right-clicking and selecting 'open group' from a contextual menu. As shown in FIG. 5A, the user moves pointer 331 to thumbnail image group 340*a*. Opening the group results in the application windows 203*a*-203*d* from the thumbnail image group 340*a* animating to full screen, while simultaneously, application windows 503*a*-503*b* are declared by the system as a second grouping of application windows, animating to a thumbnail image 540 shown in FIG. 5B. It should be understood by those skilled in the art that the second group of windows may be declared automatically upon retrieval of the first group of windows. Alternatively, the system may be configured to require a user to actively declare the second group of windows.

Figure 5B:
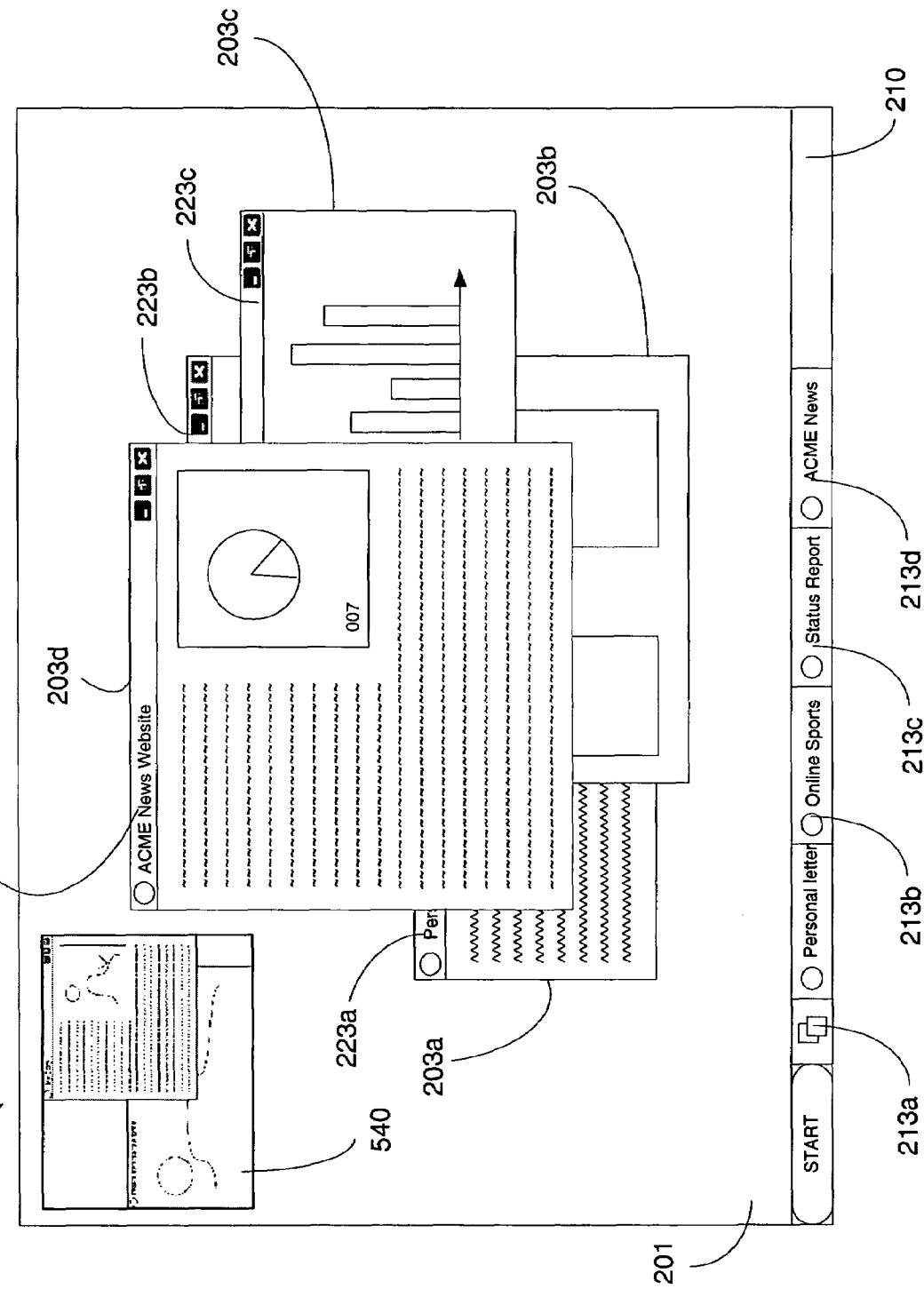
FIG. 5B illustrates an example of the window management system of FIG. 5A upon reopening of a first grouping of windows in accordance with at least one aspect of the present invention.

FIG. 5B illustrates the scenario 500*b* of opening the first window group via thumbnail image 340*a*. The second group has been subsequently minimized to a thumbnail image 540, replacing the position of the first group as thumbnail image 340*a*. Once a window group has been retrieved, normal window interactions are in effect. Individual application windows can be moved, activated, and closed. It should be understood that windows 503*a* and 503*b* may be grouped implicitly by the fact that another group of windows already exist. As such, a user need not actuate the group control 330 a second time to group windows 503*a* and 503*b*.

It should be understood by those skilled in the art that aspects of the present invention are not limited to the number of windows and/or groups shown in the Figures and that any number of different groups of windows may be created. Further, it should be understood that in accordance with various aspects of the present invention, one or more windows may be added or removed from a window group. In addition, an application window in one window group may also appear in another window group. Still further, aspects of the present invention allow for the window groups to be saved and restored across machine starts and/or logout/login sessions.

Aspects of the present invention support windowing operations on a window group. For example, a command actuated upon a window group to close, save, or refresh content, may cause all of the windows within that group to close, save, or refresh its content. A command may be global to the entire group, specific to a subset of windows within the group, or specific to one application window. When a window application is within two separate groups, a command performed on the application window in one group may be configured to perform or not perform the same operation on the same application window in another group. Still further, command options may change as new application windows are added to and/or removed from a group. For example, if a group that includes two windows, in which each is able to perform a refresh operation, has a new window without the capability to refresh its content added to the group, a refresh command may no longer be an option available to a user when manipulating the group of windows. Commands for use on the windows as a group may or may not be dynamic depending upon how the system has been configured.

Figure 6:
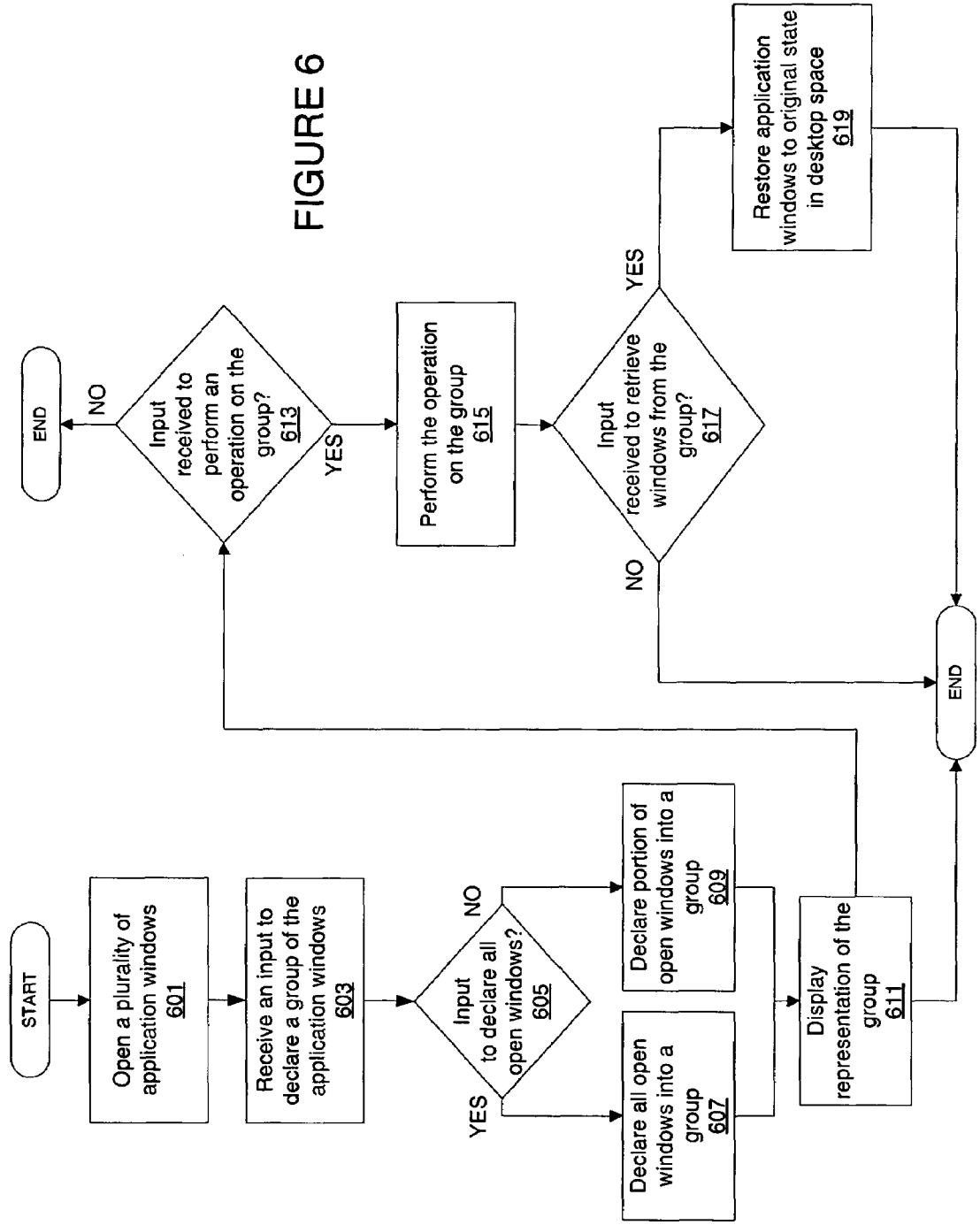
FIG. 6 is a flowchart of an illustrative example of a method for grouping two windows in accordance with at least one aspect of the present invention.

FIG. 6 is a flowchart of an illustrative example of a method for grouping a plurality of application windows in accordance with at least one aspect of the present invention. The process starts at step 601 where a plurality of application windows is opened. At step 603, an input is received to declare the plurality of open application windows into a group. The process moves to step 605 where a determination is made as to whether all open windows are to be grouped together. If all open windows are to be grouped together, the process moves to step 607 where all of the plurality of windows are declared as a group, and the process then proceeds to step 611. If the determination of step 605 finds that not all of the open windows are to be grouped together, the process proceeds to step 609 where a portion of the plurality of application windows are declared as a group, and the process proceeds to step 611. At step 611, a representation of the group of application windows is displayed. With the representation of windows displayed in step 611, the process may end. It should be understood that step 611 may be a thumbnail image, such as thumbnail image 340*a*, an icon, such as icon 340*b*, and/or a taskbar button, such as taskbar button 340*c*.

The process also may continue to step 613 where a determination is made as to whether an input has been received to perform an operation on the group of application windows in the representation. One type of operation may include an operation to save the content of the application windows within the representation. If an input has not been received, the process ends. If an input has been received at step 613, the process moves to step 615 where the operation is performed on the application windows within the group. In such a case of saving the content, if the operation is global, the content of each of the application windows is saved. Alternatively, if the operation is directed to a subset of the application windows or a single application window in the group, the operation is performed only on the subset or the one window to which the operation was directed.

From step 615, the process moves to step 617 where a determination is made as to whether an input has been received to retrieve the application windows from the group. For example, a user may decide that she desires to have the application windows restored to their original state. If an input has not been received, the process ends. If an input has been received at step 617, the process moves to step 619 where the application windows are restored to their original state in the desktop space and the process ends.

FIG. 7 is a flowchart of an illustrative example of a method for switching between multiple groupings of windows in accordance with at least one aspect of the present invention. The process starts at step 701 where a plurality of application windows is opened. At step 703, an input is received to declare the plurality of open application windows into a group. At step 705, the application windows are declared as a first group. Proceeding to step 707, a representation of the first group of application windows is displayed.

At step 709, an input is received to open at least one new application window. At step 711, at least one new application window is opened. It should be understood that the at least one new application window may be a same application window as in the first group of application windows. From step 711, one of two processions in the process may occur as defined by a solid line for steps 713-721 and as defined by a dashed line for steps 723-729. As shown in the first procession, from step 711, the process proceeds to step 713 where an input is received to declare the at least one new application window into a group. At step 715, the at least one new application window is declared as a second group. Proceeding to step 717, a representation of the second group of the at least one application window is displayed. At step 719, a determination is made as to whether an input has been received to retrieve the application window(s) from the selected first or second group. If not, the process waits until a selection is made and received. If an input is received at step 719, the process proceeds to step 721 where the application window(s) of the selected group are restored to their original state in the desktop space and the process ends.

As shown in the second procession defined by the dashed lines between the steps, from step 711, the process proceeds to step 723 where a determination is made as to whether an input has been received to retrieve the application windows from the first group. If not, the process waits until an input is received. If an input is received at step 723, the process proceeds to step 725 where the system automatically declares the at least one new application window in the desktop space into a second group. Because the user has decided to return to the first group of application windows, the system implicitly groups the new application window(s) into a new group. The process proceeds to step 727 where a representation of the second group of application windows is displayed. At step 729, the application windows of the first group are restored to their original state in the desktop space and the process ends. It should be understood by those skilled in the art that a user may switch between groups of application windows as desired by following one or more of the above described steps.

Another embodiment is programmatically controlling the declaration and grouping of windows directly into a group. For example, one or more applications, such as Microsoft Office, may share the concept of a project consisting of several documents. These documents may be opened simultaneously into a group or automatically added to a group as new documents in the project are opened by a user.

With respect to an application programming interface (API), various aspects of the present invention may be performed by an API. For example, public APIs may interface with an operating system to allow the operating system to provide the various features of the present invention. In one embodiment, a software architecture for processing data representative of grouped windows may include a component configured to group a first open window and a second open window into a group and an application program interface to access the component. An API may receive a request to group two windows, access the necessary function(s) to perform the operation, and then send the results back to an operating system. The operating system may use the data provided from the API to perform the various features of the present invention.

APIs that let application programs take advantage of window groups includes grouping and un-grouping windows programmatically, as well as letting application programs specify how the states of the windows are handled when a command is implemented on a group, such as save, print, refresh content, compare versions, compile source code, etc. This state information allows a window of an application program in a group to restore to an appropriate, instead of a default, state when a group is retrieved and the corresponding application windows are restored. For example, a minimized window that was declared to a group may be restored into an original state.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for grouping a plurality of application windows, the method comprising steps of:
presenting a first application window and a second application window on a display, wherein each of the first and second application windows is in an open state, and further wherein the first application window corresponds to a first application and the second application window corresponds to a second application, the second application being different than the first;
presenting a first taskbar button corresponding to the first application window and a second taskbar button corresponding to the second application window in a taskbar area on the display;
declaring the first application window and the second application window as a first group such that the first and second application windows are members of the first group, the second application window being independent of and external to the first application window;
presenting a representation of the first group on the display, the representation of the first group being separate from the first application window and the second application window, wherein the representation of the first group is positioned on a portion of the display that does not coincide with the taskbar area;
removing the first and second application windows from the display in response to presenting the representation of the first group;
removing the first and second taskbar buttons from the taskbar area of the display in response to presenting the representation of the first group;
presenting a third application window in an open state on the display;
presenting a third taskbar button corresponding to the third application window in the taskbar area on the display;
receiving a user input comprising a command to restore the first and second application windows from the representation of the first group;
automatically declaring the third application window as a second group in response to receiving the command to restore the first and second application windows from the representation of the first group, wherein the second group is independent of and external to the first group;
restoring the first application window and the second application window in an open state on the display in response to receiving the command to restore the first and second application windows from the representation of the first group;
restoring the first and second taskbar buttons to the taskbar area on the display in response to receiving the input;
presenting a representation of the second group on the display in response to restoring the first and second application windows from the first group, the representation of the second group being separate from the third application window;
removing the third application window from the display in response to presenting the representation of the second group; and
removing the third taskbar button from the taskbar area of the display in response to presenting the representation of the second group.

2. The method of claim 1, further comprising a step of performing an operation on the first group.

3. The method of claim 2, wherein the step of performing an operation is based upon receipt of a command from an input device.

4. The method of claim 2, wherein the step of performing an operation is performed on a subset of the members of the first group.

5. The method of claim 1, wherein the step of declaring the first application window and the second application window as the first group is performed in response to receiving an input from an input device, the input comprising a command to group the first application window and the second application window.

6. The method of claim 1, wherein the representation of the first group comprises a thumbnail image depicting the first and second application windows.

7. The method of claim 1, wherein the representation of the first group comprises an icon.

8. One or more computer-readable storage media having computer-executable instructions embodied thereon for performing a method of grouping a plurality of application windows, the method comprising:
presenting a first application window in an open state on a display, wherein the first application window corresponds to a first application;
presenting a second application window in an open state on the display, the second application window corresponding to a second application, wherein the second application window is independent of and external to the first application window, and further wherein the first and second applications are different;
presenting a first taskbar button corresponding to the first application window and a second taskbar button corresponding to the second application window in a taskbar area on the display;
declaring the first application window and the second application window as a first group;
grouping the first application window and the second application window into the first group;
presenting a representation of the first group on the display, the representation of the first group being separate from the first application window and the second application window, wherein the representation of the first group is positioned on a portion of the display that does not coincide with the taskbar area;
removing the first and second application windows from the display in response to presenting the representation of the first group;
removing the first second taskbar buttons from the taskbar area of the display in response to presenting the representation of the first group;
presenting a third application window in an open state on the display;
presenting a third taskbar button corresponding to the third application window in the taskbar area on the display;
receiving an input to restore the first application window and the second application window to the display;
declaring the third application window as a second group, wherein said declaring is performed automatically in response to receiving the input to restore the first and second application windows to the display;
grouping the third application window into the second group, wherein said grouping is performed automatically in response to receiving the input to restore the first and second application windows to the display;

restoring the first application window and the second application window to an open state on the display in response to receiving the input;

restoring the first and second taskbar buttons to the taskbar area on the display in response to receiving the input;

presenting a representation of the second group on the display automatically in response to restoring the first and second application windows to the display, the representation of the second group being separate from the third application window;

removing the third application window from the display automatically in response to restoring the first and second application windows to the display; and removing the third taskbar button from the taskbar area automatically in response to restoring the first and second application windows to the display.

9. The media of claim 8, further comprising performing an operation on the first group, wherein said performing an operation comprises performing the operation on each member of the first group.

10. The media of claim 9, wherein said performing an operation comprises performing the operation on a subset of the members of the first group.

11. The media of claim 9, wherein the step of performing an operation is based upon receipt of a command from an input device.

12. The media of claim 8, wherein the step of declaring the first application window and the second application window as the first group is performed in response to receiving an input from an input device to group the first application window and the second application window.

13. The media of claim 8, wherein the representation of the first group comprises a thumbnail image depicting the first and second application windows.

14. The computer-readable storage medium of claim 8, wherein the representation of the first group comprises an icon.

15. One or more computer-readable storage media having computer-executable instructions embodied thereon for performing a method of grouping a plurality of application windows, the method comprising:

presenting a first application window on a display in an open state, wherein the first application window corresponds to a first application;

presenting a first instance of a second application window on a display in an open state, the second application window corresponding to a second application, wherein the first and second applications are different;

presenting a first taskbar button corresponding to the first application window and a second taskbar button corresponding to the first instance of the second application window in a taskbar area on the display;

declaring the first application window and the first instance of the second application window as a first group;

grouping the first application window and the first instance of the second application window into the first group, wherein each of the first and second application windows comprises a member of the first group;

presenting a representation of the first group on a portion of the display that does not coincide with the taskbar area, the representation of the first group comprising a thumbnail image that depicts both the first application window and the second application window, wherein the representation of the first group is separate from the first application window and the second application window;

removing the first application window and the first instance of the second application window from the display in response to presenting the representation of the first group;

removing the first and second taskbar buttons from the taskbar area in response to presenting the representation of the first group;

receiving an instruction to present a second instance of the second application window in an open state on the display without removing the representation of the first group;

presenting the second instance of the second application window on the display in an open state in response to receiving the instruction such that the second instance of the second application window and the representation of the first group are both presented on the display;

presenting a third taskbar button corresponding to the second instance of the second application window in the taskbar area on the display;

declaring the second instance of the second application window as a second group, wherein the second group is separate from the first group;

grouping the second instance of the second application window into the second group such that each of the first and second groups comprises an instance of the second application window;

receiving an instruction to restore the members of the first group to the display;

presenting a representation of the second group on a portion of the display that does not coincide with the taskbar area automatically in response to receiving the instruction to restore the members of the first group to the display, the representation of the second group comprising a thumbnail image of the second application window, wherein the representation of the second group is separate from the second application window;

removing the second instance of the second application window from the display automatically in response to presenting the representation of the second group;

removing the second taskbar button from the taskbar area automatically in response to presenting the representation of the second group;

restoring the first application window and the first instance of the second application window to an open state on the display in response to receiving the instruction to restore the members of the first group to the display; and restoring the first and second taskbar buttons to the taskbar area on the display in response to receiving the instruction to restore the members of the first group to the display.

16. The media of claim 15, further comprising programmatically saving the first group during a logout session.

17. The media of claim 15, further comprising:
receiving an instruction to perform an operation on the second application window;
performing the operation on the first instance of the second application window; and
performing the operation on the second instance of the second application window.

18. The media of claim 15, further comprising:
receiving an instruction to perform an operation on the first instance of the second application window; and
performing the operation on the first instance of the second application window, wherein the operation is not performed on the second instance of the second application window.

* * * * *